3,166,594
PROCESS FOR PREPARING TETRACHLORO-5,6-DI-NITROBENZENE AND TETRACHLORO-O-PHENYLENE DIAMINE
John Frederick Harris, Meldreth, near Royston, and David William John Lane, Barton, England, assignors to Fisons Pest Control Limited, Harston, Cambridgeshire, England
No Drawing. Filed Nov. 4, 1963, Ser. No. 321,351
Claims priority, application Great Britain, Nov. 10, 1962, 42,553/62
13 Claims. (Cl. 260—580)

The present invention relates to a process for the preparation of 1,2,3,4-tetrachloro-5,6-dinitrobenzene and also to the reduction of this to tetrachloro-o-phenylene diamine.

It has now surprisingly been found that 1,2,3,4-tetrachlorobenzene can be di-nitrated in high yield to 1,2,3,4-tetrachloro - 5,6 - dinitrobenzene, and that 1,2,3,4-tetrachloro-5,6-dinitrobenzene so obtained can be simply reduced to tetrachloro-o-phenylene diamine. Further the 1,2,3,4-tetrachlorobenzene may be obtained in high yield by the chlorination of 1,2,3-trichlorobenzene in the presence of a nuclear chlorination catalyst.

Tetrachloro-o-phenylene diamine is a fungicide. Tetrachloro-o-phenylene diamine may also be an intermediate in the manufacture of other useful compounds; for example this may be converted readily to tetrachlorobenzotriazole, which is also a fungicide.

The present invention is for a process for the preparation of 1,2,3,4-tetrachloro-5,6-dinitrobenzene which comprises di-nitrating 1,2,3,4-tetrachlorobenzene by treatment with a mixture of concentrated sulphuric and nitric acids at elevated temperature.

The present invention is also for a process for the preparation of 1,2,3,4-tetrachloro-5,6-dinitrobenzene as described above characterised in that the 1,2,3,4-tetrachlorobenzene is prepared by the chlorination of 1,2,3-trichlorobenzene in the presence of a nuclear chlorination catalyst.

The present invention is also for a process for the preparation of tetrachloro-o-phenylene diamine which comprises reducing 1,2,3,4-tetrachloro-5,6-dinitrobenzene, suitably prepared as described above.

In the di-nitration of 1,2,3,4-tetrachlorobenzene the nitric acid may be of a concentration in the range 80–100%, preferably 95–100% by weight and the sulphuric acid may be of a concentration in the range 90–100%, preferably 93.5–100% by weight. It is preferred to use the most concentrated acids, as in this case the nitration proceeds most rapidly. Where one acid is used in a concentration at the lower limit indicated, the other acid should desirably be of a concentration towards the upper limit indicated.

The nitric acid requires to be used in considerable excess, comprising at least a 5 fold excess, over the stoichiometric equivalent, and suitably 15–30 mols of nitric acid are used per mol of 1,2,3,4-tetrachlorobenzene. The sulphuric acid also should be present in amount comprising at least the molecular equivalent of the nitric acid. Desirably the sulphuric acid is present in excess comprising 1.2–5 mols and preferably about 1.5 mols of sulphuric acid per mol of nitric acid.

The nitration should be carried out at an elevated temperature, desirably in the range 50–115° C. It is preferred to carry out the nitration under reflux, which is at a temperature of about 105–108° C. The time required for the reaction is dependent on the reaction temperature, being shorter at the higher temperatures and longer at the lower temperatures.

This nitration can be carried out with an efficiency of 85%.

The chlorination of 1,2,3-trichlorobenzene is carried out using chlorine; suitably chlorine is bubbled through the reaction medium containing 1,2,3-trichlorobenzene. However other methods of contacting the 1,2,3-trichlorobenzene and chlorine may be used if desired, such as passing chlorine over a film of medium containing the 1,2,3-trichlorobenzene.

The chlorination is carried out in the presence of a nuclear chlorination catalyst; by this term is meant an active metal chloride such as aluminium chloride, ferric chloride, tin chloride and antimony chloride. In the case of ferric chloride this may be formed in situ by the addition of iron, for example as iron filings, to the reaction. It is preferred to use aluminium chloride as the catalyst.

The amount of nuclear chlorination catalyst employed may vary over a wide range and may comprise for example 0.05–5%, and preferably 0.1–2% by weight of the 1,2,3-trichlorobenzene.

Where the chlorination is carried out by passing chlorine through the reaction medium, it is desirable for the reaction medium to be agitated vigorously, for example by use of a mechanical stirrer. The chlorination is suitably carried out at an elevated temperature, which preferably lies between 50 and 100° C. The 1,2,3-trichlorobenzene may be chlorinated without dilution or dispersion, or if desired the chlorination may be carried out in an inert solvent such as carbon tetrachloride.

It has been found that a surprisingly high yield of 1,2,3,4-tetrachlorobenzene may be obtained from 1,2,3-trichlorobenzene by chlorinating as described to an average take up of chlorine of 0.2–0.85 chlorine atoms per mol of 1,2,3-trichlorobenzene. While chlorination to a higher take up of chlorine viz. up to 1 chlorine atom per mol of 1,2,3-trichlorobenzene may be adopted, this results in the formation of the pentachlorobenzene. According to a preferred feature of the invention the chlorination of the 1,2,3-trichlorobenzene is stopped when 0.2–0.85, and preferably 0.6–0.85, chlorine atoms have been taken up per mol of 1,2,3-trichlorobenzene. Separation of the unreacted 1,2,3-trichlorobenzene from the 1,2,3,4-tetrachlorobenzene is conveniently achieved by fractional distillation, the separated 1,2,3-trichlorobenzene being recycled for subsequent chlorination.

This chlorination can be carried out with an efficiency of over 95%.

The reduction of the 1,2,3,4-tetrachloro-5,6-dinitrobenzene may be carried out in any conventional way, preferably under acidic or neutral conditions. Thus for example the 1,2,3,4-tetrachloro-5,6-dinitrobenzene may be reduced using stannous chloride and hydrochloric acid, stannous chloride and an alcohol such as ethyl alcohol or isopropyl alcohol, sodium hydrosulphite or zinc and an acid such as acetic acid or hydrochloric acid. The reduction is suitably carried out in the presence of a solvent for tetrachloro-o-phenylene diamine such as an alcohol for example ethyl alcohol or isopropyl alcohol, dioxan or tetrahydrofuran. This reduction can be carried out with an efficiency of 95%.

The following examples are given to illustrate the process of the present invention. The parts and percentages are by weight.

*Example 1*

100 parts of commercial 1,2,3-trichlorobenzene were chlorinated in the presence of 0.2 part of aluminum chloride at 55–60° C. until 113 parts of polychlorobenzenes were obtained, that is equivalent to the take up of 0.69 atom of chlorine per molecule of 1,2,3-trichlorobenzene. The product was fractionally distilled to separate the 1,2,3,4-tetrachlorobenzene and unreacted 1,2,3-trichlorobenzene. The unreacted 1,2,3-trichlorobenzene was used in a further chlorination. The yield of 1,2,3,4-tetrachlorobenzene was at least 95%.

1 part of the 1,2,3,4-tetrachlorobenzene so obtained was refluxed at 105–108° C. with a mixture of 30 parts of 98% sulphuric acid and 20 parts of 95% nitric acid for 2 hours. An 85% yield of 1,2,3,4-tetrachloro-5,6-dinitrobenzene (melting point 147–150° C.) was obtained after cooling, filtration and washing.

Similar results are obtained by reacting at 50–60° C. for 18 hours.

1.6 parts of the 1,2,3,4-tetrachloro-5,6-dinitrobenzene so obtained were added slowly to a refluxing solution of 9.7 parts of stannous chloride, 7.85 parts of isopropyl-alcohol and 12.5 parts of hydrochloric acid, the reflux being maintained by the addition of the dinitro compound. When the addition was complete the mixture was refluxed for a further 15 minutes, diluted with water and allowed to cool. The product tetrachloro-o-phenylene diamine was filtered off and water washed to yield white crystalline solid. Yield 95%. Melting point 232° C. (with decomposition).

The overall yield of tetrachloro-o-phenylene diamine from 1,2,3-trichlorobenzene was 77%.

*Example 2*

The process of Example 1 was repeated, but where commercial 1,2,3-trichlorobenzene containing 0.2% by weight AlCl₃ was chlorinated for 45 minutes at 80–90° C., until the increase in weight corresponded to the addition of one chlorine atom per mol.

The yield of 1,2,3,4-tetrachlorobenzene was 85%, which is lower than the yield obtained by the preferred procedure described in Example 1 and the overall yield of tetrachloro-o-phenylene diamine was 68%.

*Example 3*

1 part of 1,2,3,4-tetrachlorobenzene was refluxed at 106–108° C. with a mixture of 5.5 parts of 95% nitric acid and 11.7 parts of 98% sulphuric acid for 2 hours. A 79% yield of 1,2,3,4-tetrachloro-5,6-dinitrobenzene (melting point 149–151° C.) was obtained after cooling, filtration and washing.

To the recovered acids after removal of the 1,2,3,4-tetrachloro-5,6-dinitrobenzene was added 4.5 parts of 65% oleum and 1.2 parts of 95% nitric acid. 1 part of 1,2,3,4-tetrachlorobenzene was nitrated with these mixed acids by refluxing at 110–114° C. for 1.8 hours. An 81% yield of 1,2,3,4-tetrachloro-5,6-dinitrobenzene (melting point 150–152° C.) was obtained after cooling, filtration and washing. The recovered nitric and sulphuric acid mixture, after removal of the 1,2,3,4-tetrachloro-5,6-dinitrobenzene was used for further nitrations after the addition of oleum sufficient to combine with all the water present, and after adding nitric acid sufficient to give a ratio of nitric acid to 1,2,3,4-tetrachlorobenzene of at least 5.5 parts to 1 part.

*Example 4*

To a refluxing mixture of 64 parts of sodium hydrosulphite (dithionite) in 80 parts of water and 64 parts of ethyl alcohol, 12 parts of 1,2,3,4-tetrachloro-5,6-dinitrobenzene prepared as described in Example 1 were added in portions over 15 minutes. The addition completed, the mixture was refluxed for a further 15 minutes, cooled, and added with external cooling to excess of 20% aqueous sodium hydroxide. The precipitated white solid tetrachloro-o-phenylene diamine was filtered off, washed well with water and dried. The product had a melting point of 232° C.

*Example 5*

15 parts of 1,2,3,4-tetrachloro-5,6-dinitrobenzene prepared as described in Example 3 were added over 15 minutes to a refluxing mixture of 40 parts of zinc in 100 parts of 80% acetic acid and 80 parts of ethyl alcohol. When the addition was complete, the mixture was refluxed for a further 5 minutes and the supernatant liquors decanted from the residual zinc, cooled and the product precipitated by dilution with water. The resulting white solid tetrachloro-o-phenylene diamine had a melting point of 232° C. (with decomposition).

*Example 6*

Commercial 1,2,3-trichlorobenzene containing 2.5% of anhydrous ferric chloride was chlorinated at 80–90° C. until the increase in weight corresponded to the addition of one chlorine atom per mole. The product was washed with hot dilute hydrochloric acid, and then twice with hot water, and dried. The organic layer contained 85% of 1,2,3,4-tetrachlorobenzene which corresponded to an 83% yield.

1 part of the 1,2,3,4-tetrachlorobenzene so obtained was refluxed at 105–108° C. with a mixture of 12 parts of 93% nitric acid and 15 parts of 99% sulphuric acid for two hours. The 1,2,3,4-tetrachloro-5,6-dinitrobenzene so obtained was added slowly to stannous chloride in isopropyl-alcohol, yielding tetrachloro-o-phenylene diamine.

We claim:

1. A process for the preparation of 1,2,3,4-tetrachloro-5,6-dinitrobenzene which comprises di-nitrating 1,2,3,4-tetrachlorobenzene by treatment with a mixture of nitric acid of a concentration in the range 80–100% by weight and sulphuric acid of a concentration in the range 90–100% by weight, the nitric acid being used in amount comprising a 5-fold excess over the stoichiometric equivalent, the sulphuric acid being used in amount comprising at least the molecular equivalent of the nitric acid, the di-nitration being carried out at a temperature in the range 50–115° C.

2. A process as claimed in claim 1 wherein the nitric acid is of a concentration in the range 95–100% by weight and the sulphuric acid of a concentration in the range 93.5–100% by weight.

3. A process as claimed in claim 1 wherein the nitric acid is used in amount comprising 15–30 mols per mol of 1,2,3,4-tetrachlorobenzene.

4. A process as claimed in claim 1 wherein the di-nitration is carried out at a temperature in the range 105–108° C.

5. A process for the preparation of tetrachloro-o-phenylenediamine which comprises di-nitrating 1,2,3,4-tetrachlorobenzene by treatment with a mixture of nitric acid of a concentration in the range 80–100% by weight and sulphuric acid of a concentration in the range 90—100% by weight, the nitric acid being used in amount comprising a 5-fold excess over the stoichiometric equivalent, the sulphuric acid being used in amount comprising at least the molecular equivalent of the nitric acid, the di-nitration being carried out at a temperature in the range 50–115° C., and reducing the formed 1,2,3,4-tetrachloro-5,6-dinitrobenzene under conditions selected from acid and neutral conditions.

6. A process as claimed in claim 5 wherein the reduction is effected with stannous chloride and hydrochloric acid.

7. A process as claimed in claim 5 wherein the reduction is effected with stannous chloride and an alcohol.

8. A process as claimed in claim 5 wherein the reduction is effected with sodium hydrosulphite.

9. A process as claimed in claim 5 wherein the reduction is effected with zinc and an acid.

10. A process for the preparation of 1,2,3,4-tetrachloro-5,6-dinitrobenzene which comprises chlorinating 1,2,3-trichlorobenzene in the presence of 0.05–5% by weight of a nuclear chlorination catalyst at a temperature in the range 50–100° C. to give 1,2,3,4-tetrachlorobenzene, and di-nitrating the 1,2,3,4-tetrachlorobenzene by treatment with a mixture of nitric acid of a concentration in the range 80–100% by weight and sulphuric acid of a concentration in the range 90–100% by weight, the nitric acid being used in amount comprising a 5-fold excess over the stoichiometric equivalent, the sulphuric acid being used in amount comprising at least the molecular equivalent of the nitric acid, the di-nitration being carried out at a temperature in the range 50–115° C.

11. A process as claimed in claim 10 wherein the chlorination is stopped when 0.2–0.85 chlorine atoms have been taken up per mol of 1,2,3-trichlorobenzene, the 1,2,3,4-tetrachlorobenzene being separated from the unreacted 1,2,3-trichlorobenzene before dinitration.

12. A process as claimed in claim 10 wherein nuclear chlorination catalyst is aluminium chloride.

13. A process for the preparation of tetrachloro-o-phenylene-diamine which comprises chlorinating 1,2,3-trichlorobenzene in the presence of 0.05–5% by weight of a nuclear chlorination catalyst at a temperature in the range 50–100° C. to give 1,2,3,4-tetrachlorobenzene, and di-nitrating the formed 1,2,3,4-tetrachlorobenzene by treatment with a mixture of nitric acid of a concentration in the range 80–100% by weight and sulphuric acid of a concentration in the range 90–100% by weight, the nitric acid being used in amount comprising a 5-fold excess over the stoichiometric equivalent, the sulphuric acid being used in amount comprising at least the molecular equivalent of the nitric acid, the di-nitration being carried out at a temperature in the range 50–115° C., and reducing the formed 1,2,3,4-tetrachloro-5,6-dinitrobenzene under conditions selected from acid and neutral conditions.

No references cited.